United States Patent [19]
Cianciolo et al.

[11] 3,785,890
[45] Jan. 15, 1974

[54] PROCESS FOR THE PREPARATION OF MERCURY-CONTAINING ALUMINUM HYDRIDE COMPOSITIONS

[75] Inventors: Alfred D. Cianciolo; Donald J. Sabatine, both of Hamden; James A. Scruggs, West Haven; Samuel I. Trotz, Orange, all of Conn.

[73] Assignee: Olin Corporation, New Haven, Conn.

[22] Filed: Apr. 30, 1963

[21] Appl. No.: 278,513

[52] U.S. Cl. ............................. 149/109, 423/465
[51] Int. Cl. ............................................. C01f 7/50
[58] Field of Search ................... 23/204; 423/465; 149/109

*Primary Examiner*—Carl D. Quarforth
*Assistant Examiner*—R. L. Tate
*Attorney*—Walter D. Hunter, Donald F. Clements, Richard S. Strickler and George J. Koeser

[57] ABSTRACT

A mercury-containing, non-solvated aluminum hydride composition is prepared by reacting HCl with an alkali metal aluminum hydride ($MAlH_4$) in the presence of a dialkyl ether solvent, adding mercury to the solvated aluminum hydride, formed by this reaction, and heating the product to drive off the solvent.

5 Claims, No Drawings

PROCESS FOR THE PREPARATION OF MERCURY-CONTAINING ALUMINUM HYDRIDE COMPOSITIONS

This invention relates to the preparation of mercury-containing aluminum hydride compositions. The mercury-containing aluminum hydride compositions produced by the process of this invention are stable with respect to loss of hydrogen on heating.

Aluminum hydride is a valuable material of commerce. Usually this material is produced in the presence of a lower dialkyl ether and it has only been recently prepared in non-solvated form. Aluminum hydride, in the non-solvated form, is extremely valuable as an ingredient of solid propellant compositions. Its use in such propellant compositions has been severely limited in the past by virtue of the fact that it is unstable and releases hydrogen upon heating. It has been found, for example, that if non-solvated aluminum hydride is heated at temperatures as low as 75°C. for 24 hours or less a substantial amount of the hydrogen contained in the product is released thus creating severe problems in the storing and shipping of propellant compositions containing aluminum hydride.

The mercury-containing aluminum hydride compositions of this invention in which the aluminum hydride is present in non-solvated form, when incorporated with suitable oxidizers such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the speicfic impulse; appreciable increases in performance will result from the use of high specific impulse materials. The mercury-containing, aluminum hydride compositions of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter and are mechanically strong enough to withstand ordinary handling.

In the process of this invention hydrogen chloride is reacted with an excess of an alkali metal aluminum hydride dissolved in a lower dialkyl ether to yield aluminum hydride, the alkali metal chloride and hydrogen. The reaction takes place according to the following equation:

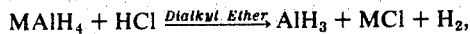

$$MAlH_4 + HCl \xrightarrow{Dialkyl\ Ether} AlH_3 + MCl + H_2,$$

wherein M is an alkali metal selected from the group consisting of lithium, sodium and potassium. The alkali metal chloride, being insoluble in the lower dialkyl ether, precipitates during the reaction and is removed by any convenient method, such as by filtration. Hydrogen generated during the reaction is allowed to escape from the reactor and is measured to determine the extent of the reaction. After removal of the insoluble alkali metal chloride, the filtrate is evaporated to dryness under vacuum at room temperature. The dry solid which results contains the etherated or solvated aluminum hydride product plus and unconverted alkali metal aluminum hydride. In the next step from about 0.0001 mole to about 1 mole or more of mercury per mole of aluminum hydride in the etherate product is added to the etherate, preferably after the etherate product has been ground to a fine powder. In the next step, which is the desolvation step, the complete removal of ether from the solvated product is accomplished by heating at a temperature ranging from ambient temperature to an elevated temperature of about 60° to about 150°C. Preferably, during this heating step a vacuum or nitrogen-sweep is employed to facilitate removal of the ether. During the desolvation step the intermediate product is maintained at the elevated temperature for a sufficiently long period of time to insure quantitative elimination of the ether. Depending upon the technique employed, this time will range from about 0.5 to about 20 hours or more. The intermediate product remaining after the heat treatment phase contains the mercury-containing, non-solvated aluminum hydride product together with the unreacted alkali metal aluminum hydride which can then be extracted from the non-solvated product with a lower dialkyl ether. Following the ether wash, the excess mercury is separated by decanting off the partially suspended hydride or by any other convenient method. The product is then filtered and dried under vacuum or with the aid of a nitrogen sweep at room temperature or at a slightly higher temperature. The reaction is essentially quantitative and although some of the non-solvated product is removed in the ether in the final ether wash, this lost product can be recovered by recycling. The in-hand yields vary from about 65 to about 85 percent of the theoretical based upon the weight of the hydrogen chloride charged to the reactor.

The temperature of the reaction will generally be from about −25°C. to about +50°C. with the preferred temperature being from about −10°C. to about +32°C.

In carrying out the reaction any of the lower dialkyl ethers can be employed. Suitable lower dialkyl ethers include dimethyl ether, ethyl ether, n-propyl ether, n-butyl ether, n-amyl ether, methyl ethyl ether, methyl propyl ether, methyl butyl ether, ethyl propyl ether, ethyl butyl ether, propyl butyl ether, isopropyl ether, isobutyl ether, isoamyl ether, methyl isopropyl ether, methyl isobutyl ether, ethyl isobutyl ether, ethyl isopropyl ether, ethyl isoamyl ether, etc. In a like manner any of the lower dialkyl ethers mentioned above are suitable for extraction of the unreacted alkali metal aluminum hydride from the crude product consisting of the alkali metal aluminum hydride and the mercury-containing, non-solvated aluminum hydride although those ethers boiling at less than 100°C. are preferred.

In operating the process of this invention it is advantageous to maintain the initial concentration of the alkali metal aluminum hydride at about 0.5 to about 10.0 percent by weight based on the weight of the lower dialkyl ether employed. The proportion of ether to the reactants not only affects the solubility of the reactants but also the extent of solution of the final product in the reaction mixture and control of the reaction temperature. In the applicants' novel process it has been found that an excess of the alkali metal aluminum hydride must be employed. Although the role of the excess alkali metal aluminum hydride is not fully understood, it is known that the excess of the alkali metal aluminum hydride participates in the solubilization of the aluminum hydride formed in the reaction and, in addition it appears to play a significant role in the desolvation step of the applicants' process in that it makes possible the complete removal of the lower dialkyl ether during the desolvation step. It has been found that if the unreacted alkali metal aluminum hydride is removed from the intermediate product containing the etherated or solvated aluminum hydride before the desolvation step it is impossible to remove the ether from the solvated aluminum hydride. The molar ratio of the hydrogen chloride to the alkali metal aluminum hydride employed can be varied widely from about 0.33 to about 0.95, with the preferred molar ratio being from about 0.74 to about 0.95.

Desolvation of the ethered aluminum hydride can be effected over a wide range of conditions with respect to the time and temperature employed. In the initial stages it is sufficient to maintain the intermediate product being desolvated under conditions of ambient temperature while preferably subjecting the material to an inert gas sweep or to a vacuum, however, the latter part of the desolvation step, in which the final quantity of ether is removed from the solvated product, requires temperatures of from about 60°C. to about 150°C. The rate of removal of the ether from the solvated product is dependent on the particle size, exposure of the surface and efficiency of removal of the liberated ether.

In the process of this invention the addition of the mercury can be accomplished in a variety of ways. Preferably, the mercury is added directly to the solid, etherated aluminum hydride product but it can also be added to the filtrate obtained when the reaction mixture is filtered to remove the insoluble alkali metal chloride. In addition, it is not necessary to add the mercury to the solid, solvated aluminum hydride as a liquid since the addition of mercury in vapor form is also satisfactory. It has been found that the time of the desolvation step can be shortened somewhat if the mercury is added not at the beginning of the heating period but at a point when about 50 to about 75 percent by weight of the ether contained in the solvated product has already been driven off.

It has been found that the mercury-containing, non-solvated aluminum hydride compositions produced by the process of this invention are quite stable with respect to the loss of hydrogen upon heating. Generally, the quantity of mercury in the non-solvated aluminum hydride products of this invention will vary from about 0.0005 percent to about 3.0 percent, based on the weight of the aluminum hydride and preferably will be from about 0.001 to about 0.2 percent based on the weight of the aluminum hydride.

The mercury-containing, non-solvated aluminum hydride produced by practicing the method of this invention can be employed as an ingredient of solid propellant compositions in accordance with general procedures which are well understood in the art, inasmuch as the mercury-containing, non-solvated aluminum hydride produced by practicing the present process is readily oxidized using conventional solid oxidizers, such as ammonium perchlorate, potassium perchlorate, sodium perchlorate, ammonium nitrate and the like. In formulating a solid propellant composition, generally from 10 to 35 parts by weight of the mercury-containing, non-solvated aluminum hydride and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided mercury-containing, non-solvated aluminum hydride can be admixed with a high solids content solution of a partially condensed urea-formaldehyde or phenol-formaldehyde resin, the proportions being such that the amount of the resin is about 5 to 10 percent by weight, based upon the weight of the oxidizer and the mercury-containing, non-solvated aluminum hydride. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Pat. No. 2,622,277 to Bonnell et al. and U.S. Pat. No. 2,646,596 to Thomas et al.

The following examples will serve to further illustrate this invention:

EXAMPLE I

A total of 40 grams of lithium aluminum hydride of 99 percent purity (1.04 mole) was placed in a three-necked, three liter, round-bottom flask which had been purged previously with dry nitrogen. Diethyl ether (2000 mls.), which had been distilled over lithium aluminum hydride, was added to the reaction flask and the mixture was stirred until solution had been achieved. The solution was then cooled with ice and water and hydrogen chloride was added to the reaction mixture through a gas inlet tube at the rate of 0.5 mole per hour. The off-gas was measured with a wet test meter to determine the end point and after 19.78 liters (STP), 0.88 mole, of gas was released and reaction was terminated. The reaction mixture was allowed to stand for 30 minutes after which it was filtered to remove the insoluble lithium chloride formed during the reaction. In the next step the ether was removed from the filtrate by distillation under vacuum and the resulting white product thus obtained was then dried under vacuum for 19 hours. This white solid product (the etherated aluminum hydride product), weighing 43 grams, was ground to a fine powder and placed in a one-necked, round-bottom flask along with 0.25 ml. of mercury. The material in the round-bottom flask was then desolvated by heating under high vacuum (maximum vacuum employed was about $10^{-2}$ mm. Hg). The heating cycle was as follows:

| Time (min.). | Bath temp. (°C.) | Product (°C.) |
|---|---|---|
| 0 | 24 | 21 |
| 23 | 65 | 54 |

-Continued

| Time (min.) | Bath temp. (°C.) | Product (°C.) |
| --- | --- | --- |
| 36 | 65 | 65 |
| 49 | 65 | 65 |
| 57 | 75 | 68 |
| 65 | 75 | 74 |
| 77 | 90 | 88 |
| 86 | 100 | 101 |
| 99 | 100 | 111 |
| 111 | 100 | 106 |
| 139 | 100 | 103 |
| 153 | 100 | 102 |

The mercury-containing, non-solvated aluminum hydride product, which now weighed 30 grams was washed by slurrying with 500 ml. of diethyl ether and then collected on a filter. The product was then given a second wash with an additional quantity of 200 ml. of diethyl ether and then collected again on a filter. In the final step, the mercury-containing non-solvated aluminum hydride product was dried for 18 hours under vacuum.

The product thus obtained was analyzed for aluminum, hydrogen, carbon, chlorine, lithium, and mercury. The following results were obtained:

| | Al | H | C | Cl | Li | Hg |
| --- | --- | --- | --- | --- | --- | --- |
| Calc'd for $AlH_3$: | 89.92 | 10.08 | — | — | — | — |
| Found: | 88.3 | 9.7 | 0.4 | 0.8 | 0.3 | 0.3 |

EXAMPLES II–X

A number of additional experiments were performed in the same manner as described in Example I and with the same equipment. Pertinent data with respect to these examples are set out in Table 1 which follows:

TABLE 1

| Example[1] | Weight of Aluminum Hydride Etherate Product (g) | Analysis of the Mercury-Contining, Non-Solvated Aluminum Hydride Product (Percent by Weight) | | | | | |
| --- | --- | --- | --- | --- | --- | --- | --- |
| | | C | H | Al | Cl | Hg | Li |
| II | 42.6 | 1.0 | 9.9 | — | — | .3 | — |
| III | 21.8 | .9 | 9.9 | — | — | — | — |
| IV | 42.8 | .4 | 9.7 | 88.3 | .8 | .3 | .3 |
| V | 28.0 | .3 | 9.8 | 87.3 | — | .02 | .3 |
| VI | 23.5 | .4 | 9.7 | — | — | .2 | .4 |
| VII | 81.0 | .5 | 9.6 | 86.3 | .8 | .9 | .4 |
| VIII | — | .5 | 9.6 | 87.1 | .7 | .009 | — |
| IX | 109.9 | .4 | 9.6 | 85.0 | .9 | 3.0 | .4 |
| X | 28.6 | .6 | 9.7 | 86.7 | .9 | — | .7 |

[1] In each instance 0.25 ml. of mercury was added to the finely-divided aluminum hydride etherate before the beginning of the desolvation step.

A portion of the product prepared in Example V in which the hydrogen content was determined to be 9.8 percent was subjected to heating at 100°C. for 24 hours. Hydrogen content of the remaining material at the 24 hour heating period was found to be 9.4 percent.

In a test for stability 0.0027 mole of aluminum hydride containing no mercury which by analysis was shown to contain 9.8 percent hydrogen was heated at 100°C. in a closed chamber (the chamber had been evacuated down to about 0.04 mm. Hg and the stopcock closed to form a closed system) for about 24 hours. The remaining material after the treatment had been completed was analyzed for hydrogen and found to contain 0.4 percent.

What is claimed is:

1. A process for the preparation of mercury-containing, nonsolvated aluminum hydride which comprises (A) reacting hydrogen chloride with an excess of an alkali metal aluminum hydride of the formula:

$$MAlH_4,$$

wherein M is an alkali metal selected from the group consisting of lithium, sodium and potassium and in the presence of a lower dialkyl ether of the formula:

$$R_1OR_2,$$

wherein $R_1$ and $R_2$ are alkyl radicals having from 1 to 5 carbon atoms, the molar ratio of the said hydrogen chloride reacted with the said alkali metal aluminum hydride being within the range of from about 0.33 to about 0.95, (B) separating liquid and solid phases of the resulting reaction mixture, (C) recovering from the liquid phase a solvated aluminum hydride product containing the unreacted alkali metal aluminum hydride, (D) adding to the solvated aluminum hydride product from about 0.0001 to about 1 mole of mercury per mole of aluminum hydride contained in the said solvated product, (E) heating the said solvated aluminum hydride product together with the added mercury at a temperature of from about 20°C. to about 150°C. and for a period of time sufficient to remove the lower dialkyl ether associated with the aluminum hydride whereby a mercury-containing, non-solvated aluminum hydride product containing the unreacted alkali metal aluminum hydride is obtained and, (F) recovering the mercury-containing, non-solvated aluminum hydride.

2. The process of claim 1 wherein the reaction is carried out at a temperature within the range of from about −25°C. to about +50°C.

3. The process of claim 1 wherein the said alkali metal aluminum hydride is lithium aluminum hydride.

4. The process of claim 1 wherein the concentration of the said alkali metal aluminum hydride initially present in the reaction mixture is from about 0.5 to about 10 percent by weight based on the weight of the lower dialkyl ether employed.

5. The process for the preparation of mercury-containing, non-solvated aluminum hydride which comprises (A) reacting hydrogen chloride with an excess of lithium aluminum hydride at a temperature of from about −25° to about +50°C. and in the presence of diethyl ether, the molar ratio of the said hydrogen chloride reacted with the said lithium aluminum hydride being from about 0.33 to about 0.95, the concentration of the lithium aluminum hydride initially present in the reaction mixture being from about 0.5 to about 10 weight per cent based on the weight of the diethyl ether employed, (B) separating liquid and solid phases of the resulting reaction mixture, (C) recovering from the liquid phase a solvated aluminum hydride product containing the unreacted lithium aluminum hydride, (D) adding to the solvated aluminum hydride product from about 0.0001 to about 1 mole of mercury per mole of aluminum hydride contained in the said solvated product, (E) heating the said solvated aluminum hydride product together with the added mercury at a temperature of from about 20°C. to about 150°C. and for a period of time sufficient to remove the diethyl ether associated with the aluminum hydride whereby a mercury-containing, non-solvated aluminum hydride product containing the unreacted lithium aluminum hydride is obtained, and (F) recovering the mercury-containing, non-solvated aluminum hydride.

* * * * *